March 22, 1949.  A. C. GROSS  2,465,223
FRUIT PEELING AND CORING MACHINE
Filed May 31, 1946  4 Sheets-Sheet 1

A. C. GROSS
INVENTOR.

BY Herbert J. Brown
ATTORNEY

March 22, 1949.  A. C. GROSS  2,465,223
FRUIT PEELING AND CORING MACHINE
Filed May 31, 1946  4 Sheets-Sheet 2
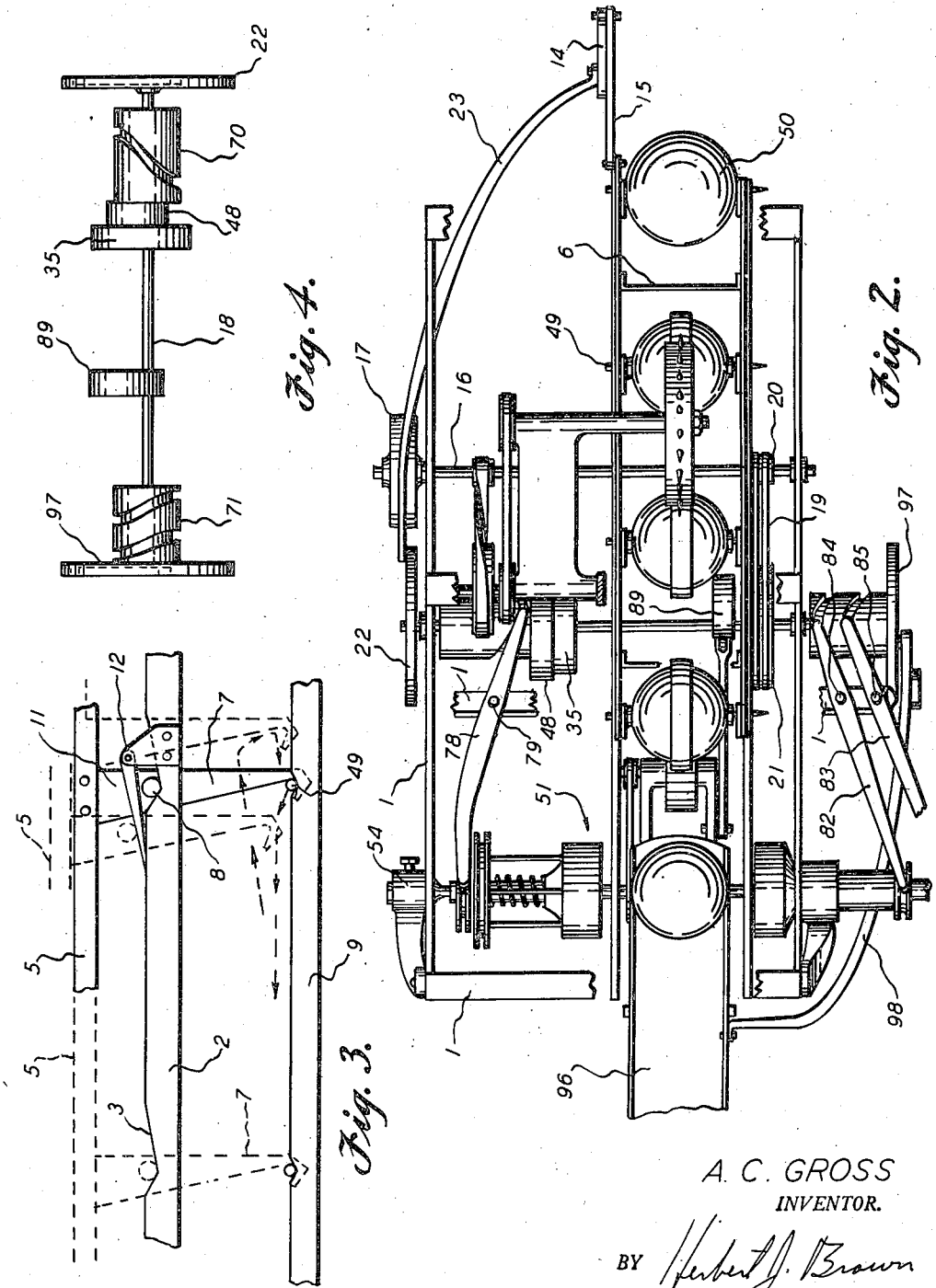
A. C. GROSS
INVENTOR.
BY Herbert J. Brown
ATTORNEY March 22, 1949.  A. C. GROSS  2,465,223
FRUIT PEELING AND CORING MACHINE
Filed May 31, 1946  4 Sheets-Sheet 3
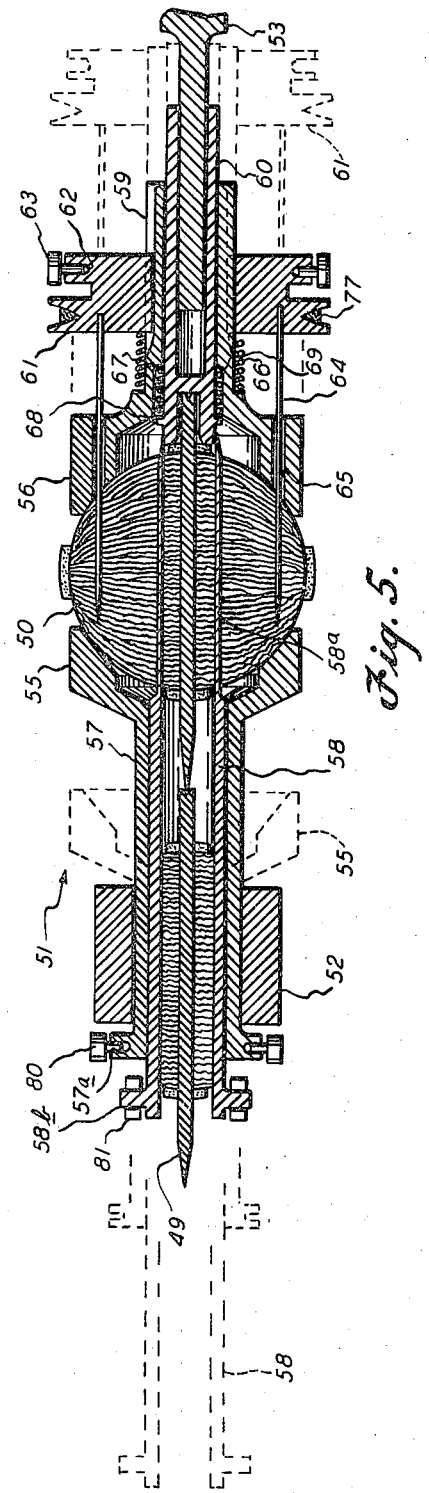
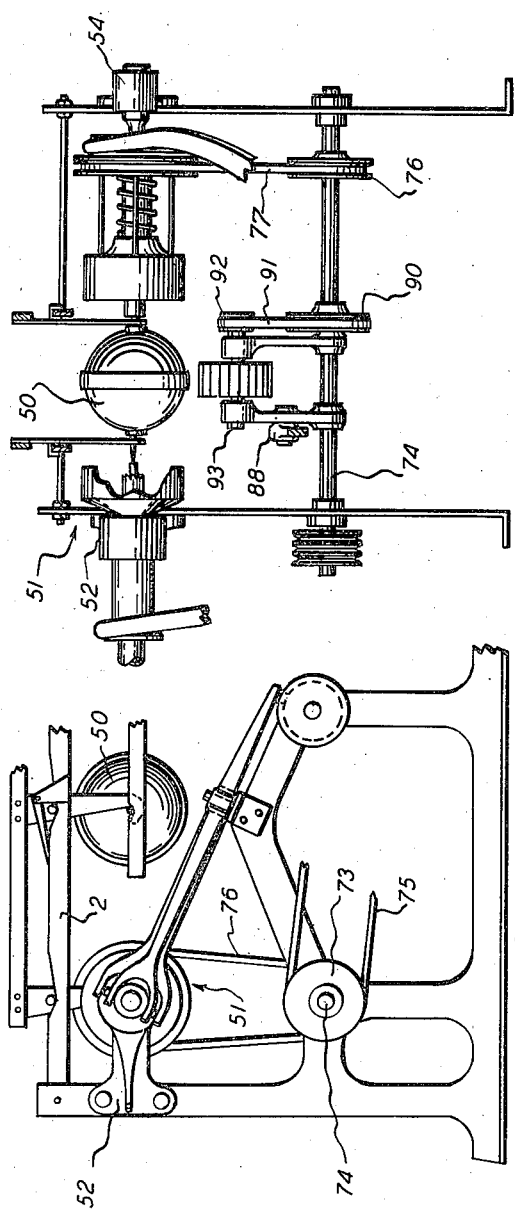
A. C. GROSS
INVENTOR.
BY Herbert J. Brown
ATTORNEY March 22, 1949.   A. C. GROSS   2,465,223
FRUIT PEELING AND CORING MACHINE
Filed May 31, 1946   4 Sheets-Sheet 4

A. C. GROSS
INVENTOR.
BY Herbert J. Brown
ATTORNEY

Patented Mar. 22, 1949

2,465,223

UNITED STATES PATENT OFFICE 2,465,223

FRUIT PEELING AND CORING MACHINE

Angell C. Gross, Corpus Christi, Tex.

Application May 31, 1946, Serial No. 673,302

5 Claims. (Cl. 146—38)

This invention relates to fruit processing apparatus, and has particular reference to a machine for removing the rinds from citrus fruit, such as grapefruit, oranges, and the like.

An object of the invention is to provide a machine whereby the rinds may be removed from fruit of the described class and leaving the meat of the same whole for canning.

Another object of the invention is to provide a machine for removing not only the rinds from citrus fruit, but the mesocarp or inner rind from whole fruit in preparation for canning in order to eliminate the bitter taste the referred to inner rind causes in the canned fruit.

A further object of the invention is to provide, in addition to the foregoing objects, a mechanism whereby the core of the fruit is also removed.

Generally, the invention contemplates the removal of rinds and cores from fruit quickly and efficiently in preparation for canning whereby the whole fruit may ultimately be served.

These and other objects will become apparent from the following description of the accompanying drawings, wherein:

Figure 2 is a broken plan view of the machine shown in Figure 1.

Figure 3 is a broken elevational view of a portion of the fruit actuating mechanism.

Figure 4 is a plan view of the cam shaft and showing the various cams positioned thereon.

Figure 5 is a vertical sectional view of the core mechanism of the machine and showing a partially processed fruit positioned therein.

Figure 6 is a broken elevational view similar to Figure 1 and showing the coring mechanism in its relative position.

Figure 7 is a lateral sectional view of the mechanism illustrated in Figure 6.

Figure 1:
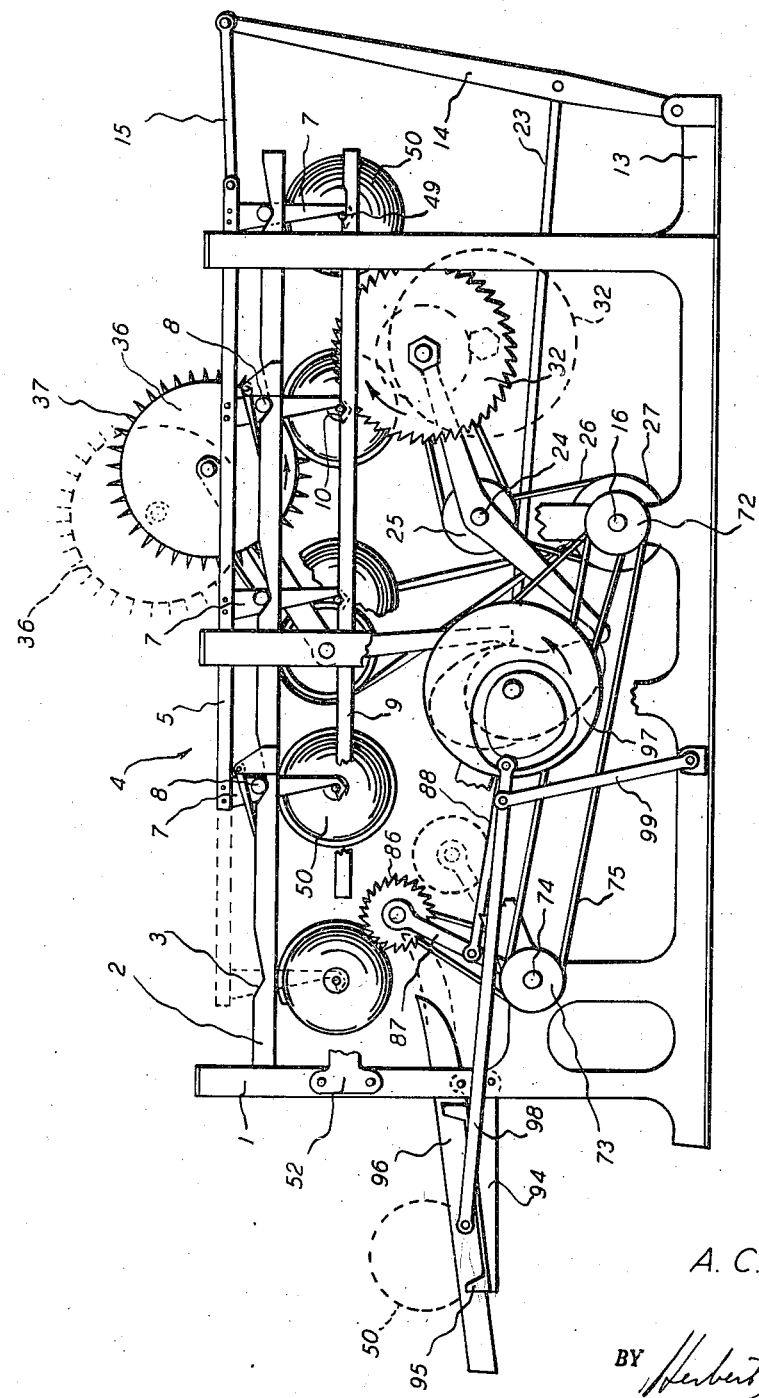
Figure 1 is a side elevational view of an exemplary form of the invention and particularly showing the various stages of the fruit during the hereinafter described process.

Accordingly, the illustrated form of the invention includes a substantially rectangular frame 1 and having a pair of parallel guide rails 2 secured near the top thereof. The upper edges of the rails 2 have angular notches 3 formed therein at spaced intervals, and which notches each have relatively large included angles.

Above the rails 2, and disposed parallel with respect thereto, there is a rectangular actuating frame 4. The frame 4 is comprised of parallel side members 5, rigidly attached cross members 6, and rigidly secured depending hooks 7, which hooks are spaced at intervals equal to the spaces between the heretofore referred to notches 3. Lugs 8 project laterally and outwardly from the hooks 7 to support the frame 4 and to engage the notches 3.

Below the parallel rails 2, and also supported by the frame 1 there is another pair of parallel rails 9 having notches 10 in their upper edges, and which notches are positioned directly below the first referred to notches 3.

Referring now to Figures 1, 3, and 6, lifting pawls 11 are positioned above each of the rail notches 3 and are pivotally retained as shown by means of brackets 12 attached to the sides of the said rails. The pawls 11 are relatively long and their points normally rest against the upper edge of the rails 2 by gravity. At the feed end of the frame 1, and supported by an outwardly extending bracket 13, there is a vertically disposed pivoted lever 14 which, in turn, is pivotally joined with the actuating frame 4 by a link 15.

Figure 8:
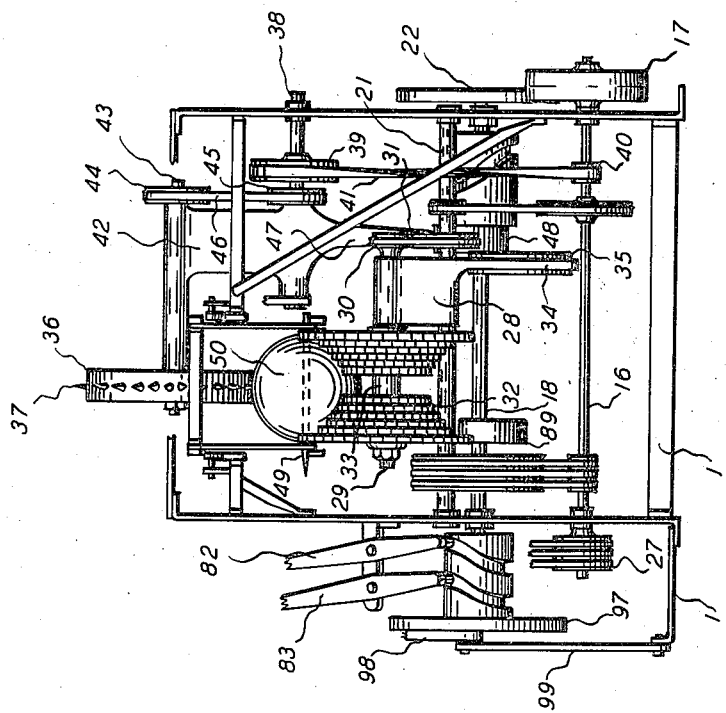
Figure 8 is an end view of the machine and showing the relative position of the primary cutters.

Referring now to Figures 1, 2, and 8, the frame 1 rotatably supports a transverse drive shaft 16, and which shaft receives power from any source, as by means of the pulley 17. The drive shaft 16 is connected with a cam shaft 18 by belts 19, or the like, each shaft being provided with pulleys 20 and 21 respectively.

Secured to the cam shaft 18 there is a cam 22 which imparts timed alternating movement to the described vertical lever 14 by means of an arm 23 pivoted to the said lever and which arm is engaged at its other end, with the said cam. The cam action thus imparted to the lever 14 causes a reciprocating movement of the upper frame 4, and by reason of the described pawl 11 and notch 3 construction described, a reciprocating action which rises on its return movement as shown in Figure 3, is imparted to the hooks 7.

Transversely supported by the frame 1 there is a shaft 24 having thereon a pulley 25, a belt 26 mounted on the latter and which belt is driven by a pulley 27 mounted on the drive shaft 16. Also mounted on the shaft 24 there is a casting 28 mounted for free rotation. At one end of the casting 28 there is a journaled shaft 29 driven by a pulley 30 and a belt 31 connected to the supporting shaft 21. Also supported and driven by the shaft 29 there is a multiple of disk cutters 32 having a spacer 33 therebetween. The arrangement of the cutters 32, which are of different diameters, has the larger cutters positioned outwardly of the smaller cutters.

The described casting 28 includes an extending arm 34 for slidably contacting a cam 35 secured on the previously referred to cam shaft 18. The described cam 35 and accompanying shaft arrangement provides for the limited inward and outward movement of the cutters 32, as well as means for driving the same.

A pressure wheel 36 having radially disposed pins 37 about its periphery is mounted in a manner similar to the one for supporting the described cutters 32. A lateral shaft 38 is rotatably supported by the frame 1 and includes thereon a pulley 39. The latter is driven by another pulley 40 mounted on the drive shaft 16 and connected with the other pulley 39 by a belt or the like 41. A casting 42 is also rotatably mounted on the driven shaft 38 and, in turn, rotatably supports another shaft 43 extending through its upper end. The shaft 43 supports a pulley 44 which is driven by another pulley 45 mounted on the connecting shaft 38 and having a belt 46 around the associated pulleys 44 and 45. The pressure wheel 36 is mounted on the shaft 43 supported by the casting 42 and is capable of limited angular movement about the said shaft and relative to the cutters 32. The casting 42 includes an extending arm 47 which acts against a cam 48 mounted on the cam shaft 18.

Referring now to Figures 1, 2, 3 and 8, a pin 49 having a point at one end thereof is positioned through the longitudinal center of the core of the fruit 50 at the beginning of the peeling operation. As will be seen from the description of operation, the fruit 50, during the peeling operation, is acted upon by the cutters 32 and, by reason of the action of the cam 48, the pressure wheel 36 engages the center of the fruit to rotate and press the same against the action of the cutters 32.

Referring now to Figures 2, 5, 6 and 7, the invention includes a coring mechanism 51 which is indicated in Figure 1 only by its supporting bracket 52. The coring mechanism 51 includes a supporting shaft 53 at one end thereof and supported by the bracket 52 secured to the frame 1. Another, but larger bracket 54, also supported by the frame 1, supports the other end of the assembly 51. The coring assembly 51 includes a pair of opposingly arranged cups 55 and 56 which, as will be seen, are capable of movement toward and away from each other for engaging and disengaging the fruit 50.

Integral with the first referred to cup 55 there is a tubular shaft 57 slidably and rotatably mounted upon another tubular shaft 58, both of which are rotatably supported by the referred to large bearing 54 which is journaled about the said outer shaft 57. The inner end of the inner shaft 58 is reduced and has teeth at its end to form a tubular coring element 58a, the axial center of which is in axial alignment with the cups 55 and 56. The second referred to cup 56, similarly supported by an integral tubular shaft 59 is mounted on another inner tubular shaft 60. The latter is journaled upon the previously referred to coring assembly supporting shaft 53.

About the last referred to cup shaft 59 and splined thereto, there is a slidable pulley 61 which includes an angular groove 62 for engaging the ends of a yoke 63. Lateral pins 64 project inwardly from the inner face of the pulley 61 and pass through openings 65 in the second referred to cup 56. Between the pulley 61 and the cup 56 there is a compression spring 66 for normally urging the said cup toward the fruit 50. The supporting tubular shaft 60 similarly supports another compression spring 67 between a shoulder 68 thereon and an internal shoulder 69 within the outer shaft 59. The effect of the last referred to spring is to normally urge the pin 49 outwardly through the corer supporting tube 58 when the latter is actuated in the manner to be described.

Referring now to Figures 2, 4, 6 and 8, the cam shaft 18 is provided with cylindrical cams 70 and 71 which actuate the cups 55 and 56, as well as the pins 64 and the longitudinal movement of the coring element 58a.

Referring now to Figures 5, 6 and 7, the pulley 61 splined to its supporting shaft 59 not only rotates the cups 55 and 56, but the pins 64, and the supporting shafts 57, 58, 59 and 60 as well. The latter operation is carried out by means of a pulley 72 mounted on the drive shaft 16, another pulley 73 mounted on a driven shaft 74 and a belt 75 connected therebetween. Another pulley 76 and belt 77 drive the coring assembly pulley 61.

The previously referred to yoke 63 which engages the pulley groove 62, is an integral part of a pivoted lever arm 78, the other end of which is engaged in one of the cylindrical cams 70. As shown in Figure 2 the lever arm 78 is supported upon the frame 1 by means of a pivot pin 79.

Similarly, the inner and outer shafts 57 and 58 at the other end of the coring assembly 51, are operated by yokes 80 and 81, the end of the first being engaged within a groove 57a in the end of the cup supporting shaft 57, whereas the other engages a flanged portion 58b at the outer end of the inner shaft 58. The yokes 80 and 81 are integral with other lever arms 82 and 83 and engage the other cylindrical cam 71. The lever arms 82 and 83 are pivoted to the frame 1 by pins 84 and 85, as particularly shown in Figure 2.

Another cutter 86 operates upon the band of rind which is left about the center of the fruit 50 by reason of the spacer 33 between the first described cutters 32. The cutter 86 is supported at the outer ends of a pair of arms 87 journaled to the previously described driven shaft 74. Intermediate the ends of the arms 87 there is a connecting arm 88 which acts upon another cam 89, the latter being secured to the cam shaft 18. The cutter 86 is driven by means of a pulley 90 and a belt 91 which is connected with a pulley 92 mounted upon the shaft 93 which supports the said cutter. By reason of the last described arrangement the cutter 86 is not only turned to remove the remaining rind of the fruit 50, but is also capable of limited angular rotation about its supporting shaft 74 so as to permit the passage of fruit 50 as the latter progresses through the apparatus.

At the end of the frame 1, supporting the coring assembly 51, there is an outwardly extending bracket 94 having a cradle 95 thereon for slidably supporting an ejector trough 96. The sliding action is carried out by means of a cam 97, mounted on the cam shaft 18, a connecting arm 98 pivotally secured to the trough 96 at one end and to the said cam at the other end, and pivoted guide arm 99 secured to the frame 1 at its one end and to the said connecting arm 98. A timed movement is thus imparted to the trough 96 so as to move under the fruit 50 at the completion of the peeling and coring operation and to allow the peeled fruit to roll from the said trough.

In operation, the pins 49 are inserted through the cores of the fruit 50 in the manner described. The projecting ends of the pins 49 are then engaged upon the first pair of hooks 7, and upon which they are successively moved from one pair of notches 10 in the guide rail 9 to the succeeding notches 10 in the same rail. This action is brought about by the described movement of the upper frame member 4, the lifting at the various stages taking place by reason of the angular notches 3 in the upper edges of the frame rails 2.

Upon reaching the second pair of notches the action of the cam 35 moves the cutter 32 upwardly to remove the rind from each side of the fruit 50. At the same time the cam 48 moves the pressure wheel 36 downwardly to rotate the fruit and to press the same against the action of the cutters 32. Through the movement of the actuating frame 4 the fruit 50 is ultimately delivered to the last pair of notches 10, whereupon the cups 55 and 56 move inwardly to engage the fruit. At the same time, the last pair of hooks 7 are moved away from the cups 55 and 56 to allow the latter to engage the fruit 50. At the same time the lateral pins 64 move inwardly to engage the fruit 50, and by reason of the described coring assembly pulley 61, cause the fruit to rotate. Immediately thereafter the corer 58a moves inwardly through the center of the fruit and around the pin 49. While this is taking place the second cutter 86 moves upwardly to remove the remaining rind of the fruit 50. Thereafter the cutter 86 assumes its downward position and the ejector trough 96 moves under the fruit 50 to receive the same. The action caused by the cylindrical cams 70 and 71 first remove the corer 58a and the pins 64, and thereafter the cups 55 and 56 move outwardly and away from each other, thus dropping the fruit into the trough 96. As will be noted in Figure 5 each succeeding operation pushes the remaining core of the fruit 50, with its pin 49 therethrough, outwardly through the end of the corer supporting shaft 58.

The form of the invention shown and described is not restrictive, but may be made in many ways within the scope of the appended claims.

What I claim is:

1. A machine for removing rinds from fruit comprising a frame, a driven rotary cutter supported by the said frame, pairs of reciprocating hooks carried by the said frame, spindles for insertion through the fruit and supported at their ends by the said pairs of hooks, and means actuating the said pairs of hooks for positioning the said fruit against the said driven rotary cutter.

2. A machine for removing rinds from fruit comprising a frame, a driven rotary cutter supported by the said frame, pairs of reciprocating hooks carried by the said frame, spindles for insertion through the said fruit and supported at their ends by the said pairs of hooks, means actuating the said pairs of hooks for positioning the said fruit against the said driven rotary cutter, and a pressure wheel supported by the said frame for rotating the said fruit against the action of the said cutters.

3. A machine for removing rinds and cores from fruit comprising a frame, a driven rotary cutter supported by the said frame, pairs of reciprocating hooks carried by the said frame, spindles for insertion through the cores of fruit and supported at their ends by the said pairs of hooks, means actuating the said pairs of hooks for positioning the said fruit against the said driven rotary cutter, and a driven coring element supported by the said frame for removing the cores from the said fruit.

4. A machine for removing rinds and cores from fruit comprising a frame, pairs of reciprocating hooks carried by the said frame, spindles for insertion through the fruit and supported at their ends by the said pairs of hooks, means actuating the pairs of hooks for positioning the said fruit against the said driven rotary cutter, a driven pressure wheel supported by the said frame for rotating the said fruit against the action of the said cutters, and a driven coring element supported by the said frame for removing the core from the said fruit after the rind has been removed from the same.

5. A machine for removing rinds from fruit comprising a frame, pairs of reciprocating hooks supported by the said frame, a driven cutter supported by the said frame and having teeth therein arranged for removing the rinds from all but the circumferential center of the said fruit, spindles for insertion through the fruit and supported at their ends by the said hooks, means actuating the pairs of hooks for positioning the fruit against the said driven cutter, a driven pressure wheel supported by the said frame for rotating the fruit against the action of the said cutters, and an additional driven cutter supported by the said frame for removing the referred to remaining rind at the circumferential center of the said fruit.

ANGELL C. GROSS.

REFERENCES CITED

The following references are of record in the file of this patent:

UNITED STATES PATENTS

| Number | Name | Date |
|---|---|---|
| 1,583,100 | Reynolds | May 4, 1926 |
| 1,699,995 | Shields | Jan. 22, 1929 |
| 2,085,225 | Lucks | June 29, 1937 |